US 10,088,679 B2

(12) United States Patent
Yonemoto

(10) Patent No.: US 10,088,679 B2
(45) Date of Patent: Oct. 2, 2018

(54) HEAD-UP DISPLAY DEVICE

(71) Applicant: DENSO CORPORATION, Kariya, Aichi-pref. (JP)

(72) Inventor: Yayoi Yonemoto, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 226 days.

(21) Appl. No.: 14/908,369

(22) PCT Filed: Jul. 31, 2014

(86) PCT No.: PCT/JP2014/004020
§ 371 (c)(1),
(2) Date: Jan. 28, 2016

(87) PCT Pub. No.: WO2015/015807
PCT Pub. Date: Feb. 5, 2015

(65) Prior Publication Data
US 2016/0161742 A1 Jun. 9, 2016

(30) Foreign Application Priority Data
Aug. 1, 2013 (JP) ................................. 2013-160547

(51) Int. Cl.
*G02F 1/1333* (2006.01)
*G02B 27/01* (2006.01)
(Continued)

(52) U.S. Cl.
CPC .......... *G02B 27/0149* (2013.01); *B60K 35/00* (2013.01); *B60R 1/00* (2013.01);
(Continued)

(58) Field of Classification Search
CPC ............................................... G02F 1/133382
See application file for complete search history.

(56) References Cited

U.S. PATENT DOCUMENTS

| 5,164,849 A | * | 11/1992 | Evans | ............... G02F 1/133382 |
| | | | | 345/101 |
| 2012/0257399 A1 | * | 10/2012 | Miyamoto | ............. G02B 27/01 |
| | | | | 362/382 |
| 2015/0098029 A1 | * | 4/2015 | Sato | ..................... G09G 3/3406 |
| | | | | 349/11 |

FOREIGN PATENT DOCUMENTS

| JP | H06032158 A | 2/1994 |
| JP | H09304751 A | 11/1997 |

(Continued)

OTHER PUBLICATIONS

International Search Report and Written Opinion (in Japanese with English Translation) for PCT/JP2014/004020, dated Oct. 7, 2014; ISA/JP.

*Primary Examiner* — Nathanael R Briggs
*Assistant Examiner* — Alexander Gross
(74) *Attorney, Agent, or Firm* — Harness, Dickey & Pierce, P.L.C.

(57) ABSTRACT

A head-up display device for a vehicle includes a housing, a temperature detector, and a light source control unit. The head-up display device projects, toward an external projection member, lights indicating display information for displaying an image produced by the reflected lights to a user positioned at a predetermined position. The housing houses the display portion and the light source disposed facing each other via heat transfer space. The temperature detector is disposed in a surrounding area of the display portion and the light source, and detects a temperature of the surrounding area. The light source control unit increases brightness of the emitted lights by increasing driving current of the light source when the detected temperature is lower than a reference low-temperature. The heat generated by the increased driving current is transferred to the display portion (Continued)

via the heat transfer space, and increases a temperature of the display portion.

9 Claims, 9 Drawing Sheets

(51) Int. Cl.
    *B60K 35/00*         (2006.01)
    *B60R 1/00*          (2006.01)
    *G02F 1/133*         (2006.01)
    *H05B 37/02*         (2006.01)
    *G09G 3/34*          (2006.01)
    *G09G 3/36*          (2006.01)

(52) U.S. Cl.
    CPC ......... *G02B 27/01* (2013.01); *G02B 27/0101* (2013.01); *G02F 1/13306* (2013.01); *G02F 1/133382* (2013.01); *G09G 3/3406* (2013.01); *H05B 37/0218* (2013.01); *H05B 37/0227* (2013.01); *B60R 2300/205* (2013.01); *G02B 2027/0112* (2013.01); *G02B 2027/0118* (2013.01); *G09G 3/36* (2013.01); *G09G 2320/0252* (2013.01); *G09G 2320/041* (2013.01); *G09G 2320/0626* (2013.01); *G09G 2360/144* (2013.01)

(56) References Cited

FOREIGN PATENT DOCUMENTS

| | | | |
|---|---|---|---|
| JP | 2001281012 A | | 10/2001 |
| JP | 2007086387 A | | 4/2007 |
| JP | 2007093939 A | * | 4/2007 |
| JP | 2009109711 A | | 5/2009 |
| JP | 2009229782 A | | 10/2009 |
| JP | 2010237238 A | | 10/2010 |
| JP | 2011090076 A | | 5/2011 |
| JP | 2012078619 A | | 4/2012 |

* cited by examiner

HEAD-UP DISPLAY DEVICE

CROSS REFERENCE TO RELATED APPLICATIONS

This application is a U.S. National Phase Application under 35 U.S.C. 371 of International Application No. PCT/JP2014/004020 filed on Jul. 31, 2014 and published in Japanese as WO 2015/015807 A1 on Feb. 5, 2015. This application is based on and claims the benefit of priority from Japanese Patent Application No. 2013-160547 filed on Aug. 1, 2013. The entire disclosures of all of the above applications are incorporated herein by reference.

TECHNICAL FIELD

The present disclosure relates to a head-up display devices.

BACKGROUND ART

A head-up display (HUD) device is known as a display device that displays, on a windshield of a vehicle, images, e.g., of a meter and the like mounted to an instrument panel of the vehicle (see Patent Literature 1). The head-up display device projects display information of the meter or the like toward the windshield, and the reflected lights of the display information produces an image corresponding to the display information so that a driver can see the reflected image. Specifically, the image is produced by the reflected lights of the display information projected onto the windshield at an outer front side of the windshield. Thus, when the driver views the display information, the display information is overlapped with a front field view of the driver. A liquid crystal display device is usually used as a device installed in such a head-up display for producing display information for the driver. The liquid crystal display device may be, for example, a vertical alignment TFT (thin film transistor) liquid crystal display, a simple matrix liquid crystal display, or the like.

In the above-described liquid crystal display device, a display response speed is very slow at low temperatures. For this reason, an indium tin oxide (ITO) heater or a thermistor needs to be provided in a display portion for heating the display portion up to a certain temperature that can ensure a certain level or more of the display response speed of the information display. The ITO heater is a semi-transparent film formed on a glass of the liquid crystal panel, and may decrease the transmission amount of light which is output from the light source for illuminating the liquid crystal panel. This may disadvantageously cause a reduction of display brightness. Further, by adding the ITO heater or thermistor and a corresponding control circuit thereof, a configuration of the device and the circuit may become complicated and manufacturing cost may be increased. In particular, when providing the ITO heater, another control circuit is also required to prevent runaway heating or failure due to breakdown of the heater, and the control circuit may cause a complication of the circuit configuration and an increase of unavoidable cost.

PRIOR ART LITERATURES

Patent Literature

[Patent Literature 1] JP 2007-86387 A

SUMMARY OF INVENTION

In view of the foregoing difficulties, it is an object of the present disclosure to provide a head-up display device that eliminates a deterioration of display response performance at low temperatures and suppresses cost increase when the head-up display device includes a display portion having a low response performance at low temperatures and a light source for illuminating the display portion.

According to a first aspect of the present disclosure, a head-up display device for a vehicle includes a housing, a temperature detector, a light source control unit, a visibility switching unit, and a visibility control unit. The head-up display device projects lights toward an external projection member and the lights are emitted from a light source and include display information generated by a display portion. The lights are reflected on the external projection member to produce an image indicating the display information to be visible to a user who is located at a predetermined position. The housing houses the display portion and the light source. The display portion and the light source are disposed facing each other via a heat transfer space in the housing. The temperature detector is disposed in a surrounding area of the display portion and the light source, and detects a temperature of the surrounding area. The light source control unit controls a brightness of the lights emitted from the light source to be increased by increasing a driving current of the light source when the temperature detected by the temperature detector is lower than a reference low-temperature. The increased driving current generates heat and the generated heat is transferred to the display portion via at least the heat transfer space. The heat transferred to the display portion increases a temperature of the display portion. The visibility switching unit switches, during a light emission operation of the light source, a visibility of the display information between a visible state in which the display information is visible to the user and an invisible state in which the display information is invisible to the user. The visibility control unit controls the visibility switching unit to switch the visibility of the display information to the invisible state when the temperature detected by the temperature detector is lower than the reference low-temperature. The light source control unit increases the driving current of the light source after the visibility switching unit switches the visibility of the display information to the invisible state in which the display information is invisible to the user. The display portion is provided by a liquid crystal panel which is capable of changing an optical transmittance by changing orientations of liquid crystals and the liquid crystal panel also functions as the visibility switching unit. The visibility control unit controls the visibility switching unit to change the orientations of the liquid crystals of the liquid crystal panel so that the lights emitted from the light source are blocked by the liquid crystals from being projected toward the projection member when the temperature detected by the temperature detector is lower than the reference low-temperature.

According to a second aspect of the present disclosure, a head-up display device for a vehicle includes a housing, a temperature detector, and a light source control unit. The head-up display device projects lights toward an external projection member and the lights are emitted from a light source and include display information generated by a display portion. The lights are reflected on the external projection member to produce an image indicating the display information to be visible to a user who is located at a predetermined position. The housing houses the display portion and the light source. The display portion and the light source are disposed facing each other via a heat transfer space in the housing. The temperature detector is disposed in a surrounding area of the display portion and the light source, and detects a temperature of the surrounding area. The light source control unit controls a brightness of the lights emitted from the light source to be increased by increasing a driving current of the light source when the temperature detected by the temperature detector is lower than a reference low-temperature. The increased driving current generates heat and the generated heat is transferred to the display portion via at least the heat transfer space. The heat transferred to the display portion increases a temperature of the display portion. The heat transfer space is partitioned, by a wall, from an adjacent space which is provided adjacent to the heat transfer space within a device case for housing the display portion, the light source, and the temperature detector, and the temperature detector is disposed in the adjacent space.

According to a third aspect of the present disclosure, a head-up display device for a vehicle includes a housing, a temperature detector, and a light source control unit. The head-up display device projects lights toward an external projection member and the lights are emitted from a light source and include display information generated by a display portion. The lights are reflected on the external projection member to produce an image indicating the display information to be visible to a user who is located at a predetermined position. The housing houses the display portion and the light source. The display portion and the light source are disposed facing each other via a heat transfer space in the housing. The temperature detector is disposed in a surrounding area of the display portion and the light source, and detects a temperature of the surrounding area. The light source control unit controls a brightness of the lights emitted from the light source to be increased by increasing a driving current of the light source when the temperature detected by the temperature detector is lower than a reference low-temperature. The increased driving current generates heat and the generated heat is transferred to the display portion via at least the heat transfer space. The heat transferred to the display portion increases a temperature of the display portion. The device case has vent holes which are respectively disposed on an upper side and a lower side of the heat transfer space when the head-up display device is equipped to a vehicle, each of the vent holes communicates the heat transfer space with an outside space. The heat transfer space is located inside of the device case which houses the display portion, the light source, and the temperature detector, and the outside space is located outside of the device case.

According to the above-mentioned head-up display device, when the head-up display device includes the display portion having a low display response performance at low temperatures and the light source for illuminating the display portion, the deterioration of the display response performance at low temperatures can be suppressed with a lower cost.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

The following will describe a head-up display device according to an embodiment of the present disclosure with reference to the accompanying drawings.

Figure 1:
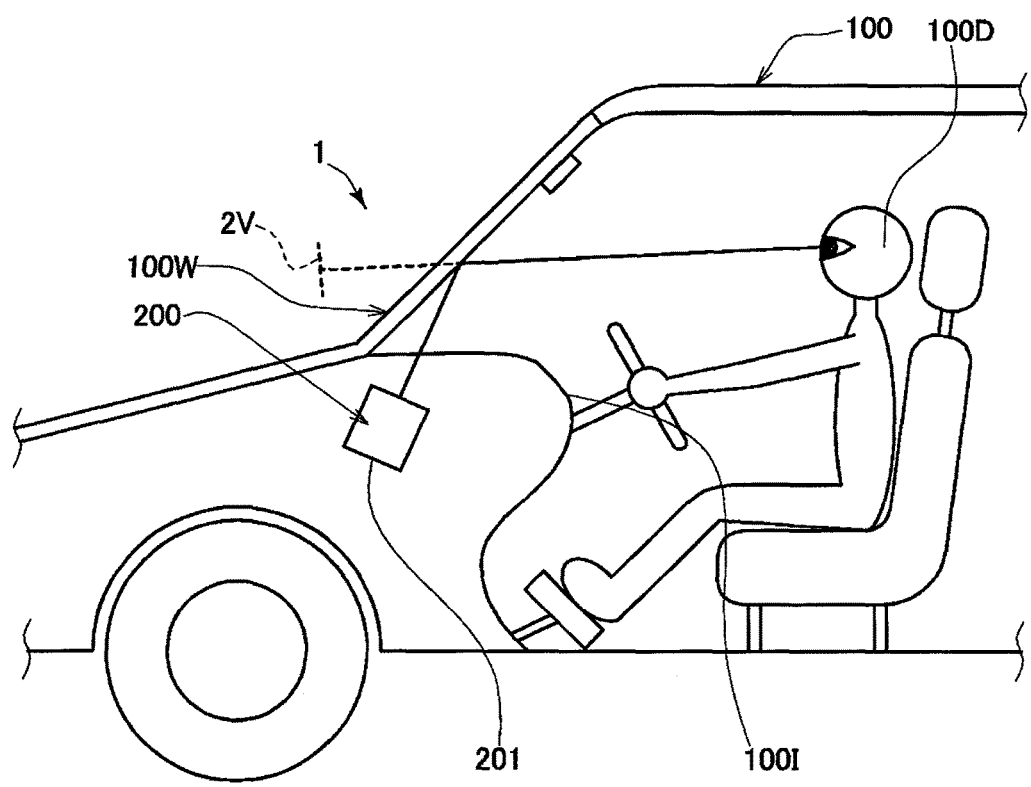
FIG. 1 is a schematic diagram showing a structure of a head-up display device according to an embodiment of the present disclosure.

As shown in FIG. 1, a head-up display device 1 projects display information, which is emitted outward from a display output portion 200, onto a projection member 100W, and projected lights of the display information are reflected toward a user 100D located at a predetermined position. With this configuration, the user 100D can view an image produced by the reflected lights. The head-up display device 1 according to the present embodiment is, for example, a device for a vehicle. The user 100D located at the predetermined position and viewing the display information is a driver who is seated on a driver's seat in the vehicle. The projection member 100W is a member that permits light to pass through. In the present disclosure, the projection member is described as a windshield (front glass) 100W of the vehicle as an example, and the windshield of the vehicle is inclined with respect to a horizontal direction of the vehicle 100.

Figure 5:
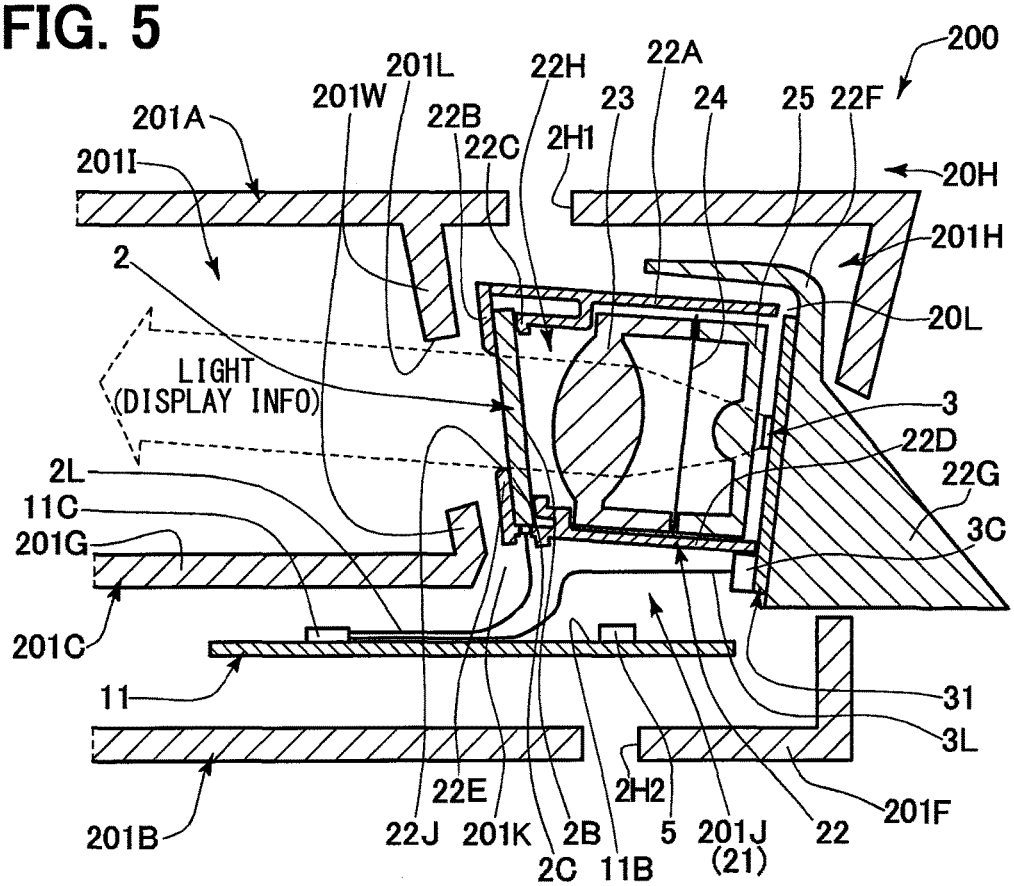
FIG. 5 is a partially enlarged cross-sectional view of the display output portion of the head-up display device shown in FIG. 1.
Figure 7:
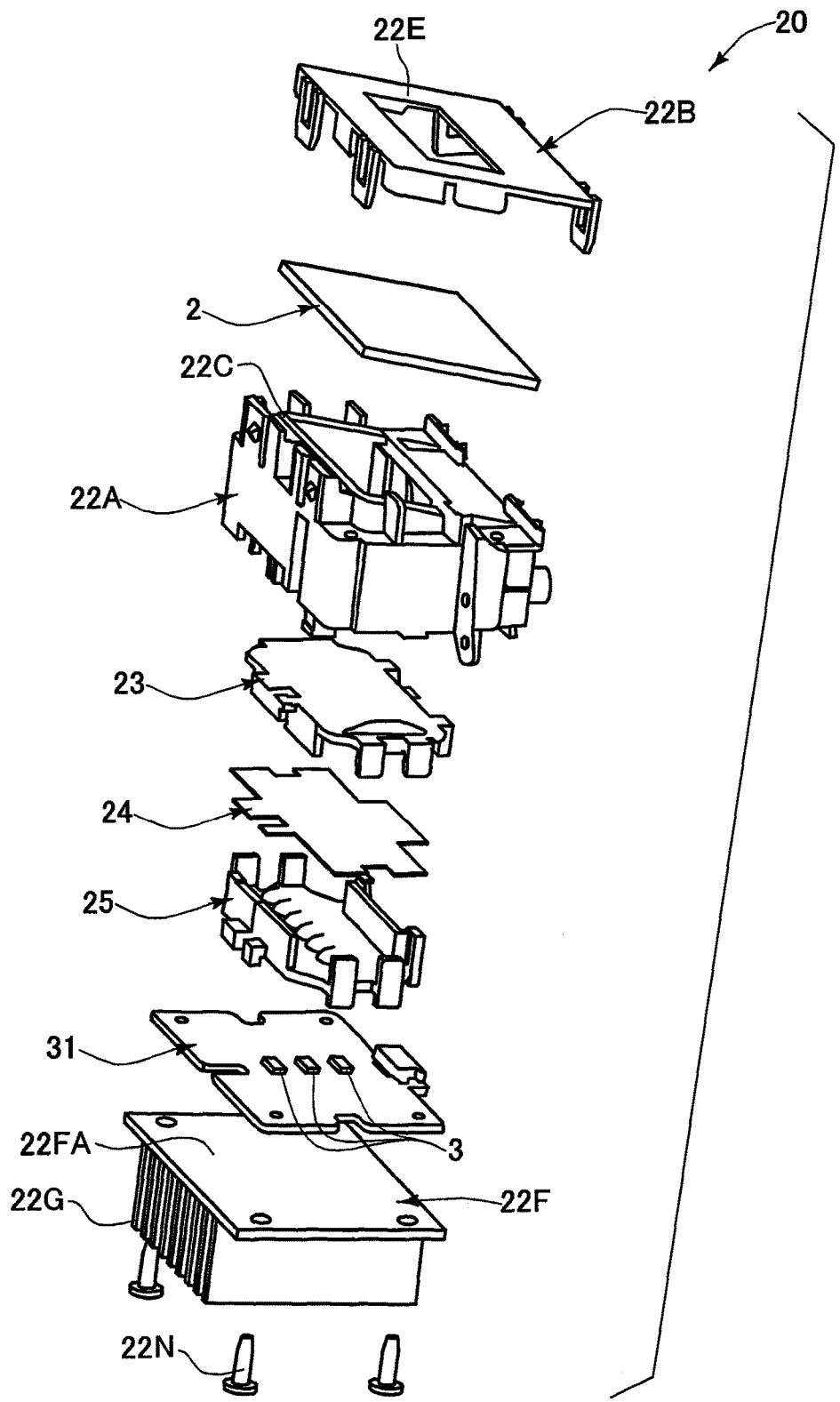
FIG. 7 is an exploded perspective view showing a main body of the head-up display device shown in FIG. 1.

As shown in FIGS. 5 and 7, the display output portion 200 includes a main body 20, and the main body 20 has a display portion 2 and a light source 3. The display portion 20 generates the display information, and the light source 3 emits lights toward the display portion 2 so that the display information generated by the display portion 2 is outputted to outside. As illustrated in FIG. 1, an instrument panel 100I of the vehicle extends from a lower side of the windshield 100W toward an inside of the vehicle 100, and the display output portion 200 according to the present embodiment is installed at an inside portion of the instrument panel 100I. In the present embodiment, the light source 3 is disposed on a backside of the display portion 2, and the display portion 2 is a transmissive display panel that is illuminated by lights emitted from the light source 3. The lights emitted from the light source 3 pass through the display panel 2 and enter the windshield 100W positioned on the upper side of the display portion 2 and the light source 3. The light entering the windshield 100W is reflected toward the user 100D sitting on the driver's seat, so that the user 100D can view an image produced by the reflected lights. The display information projected toward and reflected on the windshield 100W is captured by the driver 100D as a virtual image 2V, and the virtual image 2V is produced at a position in front of (beyond) the windshield 100W. That is, an image, which indicates the display information generated by the display panel 2, is formed on an outer front side of the windshield 100W, and the driver 100D views the display information positioned in front of (beyond) the windshield 100W.

Figure 6:
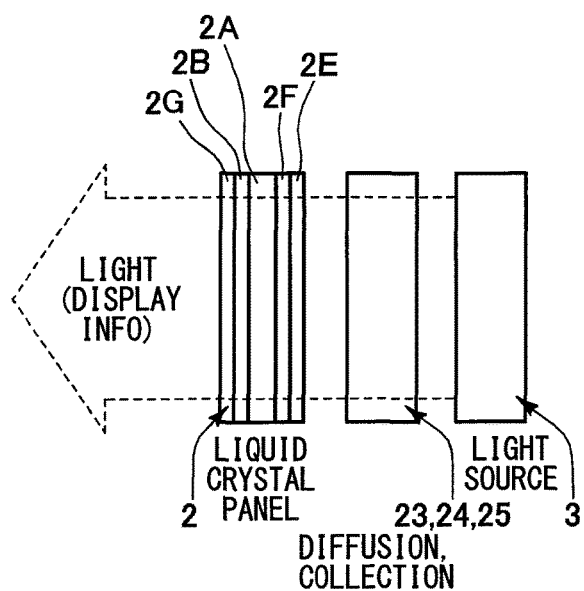
FIG. 6 is a schematic diagram showing a structure of a display portion of the head-up display device shown in FIG. 1.

The display portion 2 in the present embodiment is provided by, for example, a thin-film-transistor (TFT) liquid crystal panel. As shown in FIG. 6, the TFT liquid crystal panel 2, which is well-known, includes a liquid crystal layer 2A, glass substrates 2B and 2F sandwiching the liquid crystal layer 2A from both sides in sealing manner, and polarization plates 2G and 2E sandwiching the liquid crystal layer 2A and the glass substrates 2B and 2F from both sides. The liquid crystal panel 2 has a plurality of liquid crystal cells arranged in a matrix. For each of the liquid crystal cells, a voltage can be individually applied by a switch element and a pixel electrode that are provided in each liquid crystal cell and function as a thin film transistor (TFT). The liquid crystal panel 2 changes orientation directions of liquid crystal molecules in a pixel region of each liquid crystal cell by applying the corresponding voltage to each liquid crystal cell, thereby enabling gradation display in each pixel region. The liquid crystal panel 2 can also change the orientation directions of liquid crystal molecules in the whole liquid crystal cells for disabling a transmission of lights emitted from the light source 3 through the liquid crystal panel 2.

Figure 9:
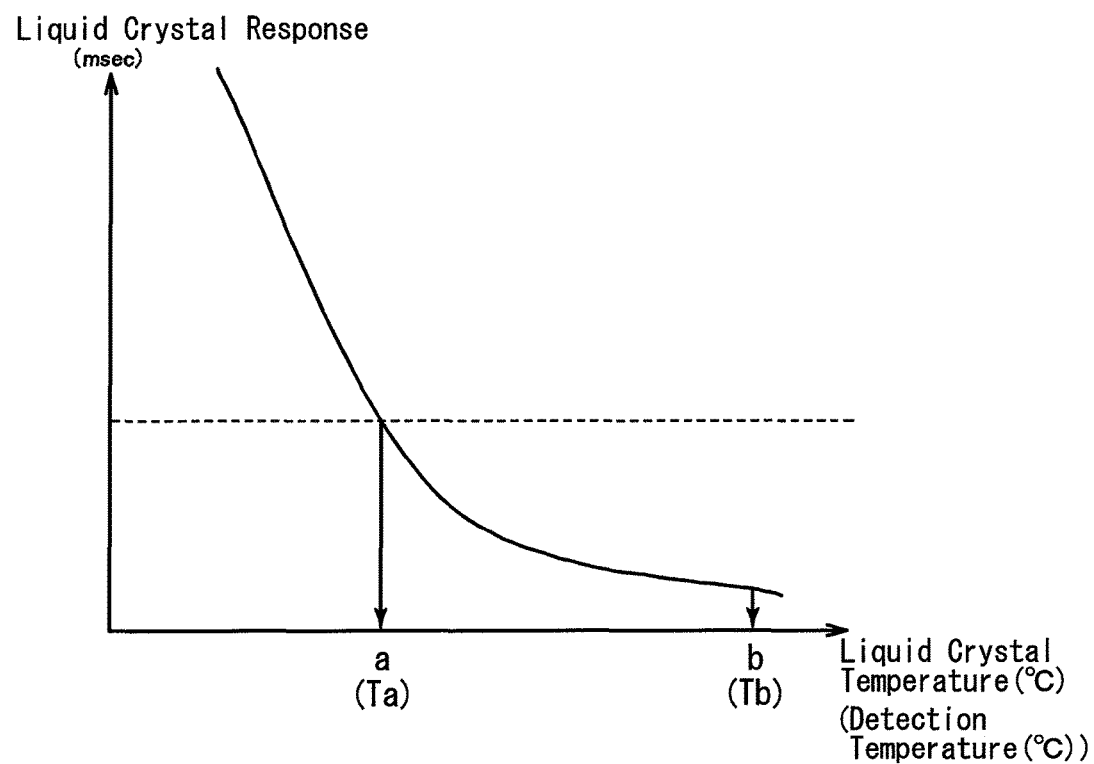
FIG. 9 is a diagram showing the corresponding relationship between the display responsiveness of the display portion and the temperature of the display portion (detection temperature of the temperature detector) in the head-up display device shown in FIG. 1.

As shown in FIG. 9, the liquid crystal panel 2 has a difficulty that a display response is under a certain level under a low-temperature condition having a temperature lower than a predetermined temperature. To eliminate such a low-temperature condition, the head-up display device 1 of the present disclosure is configured to transfer heat generated by the light emission from the light source 3 to the display portion via gas filled in a space 22H. This configuration enables a warming of the display portion 2 without providing any heater or the like.

Figure 2:
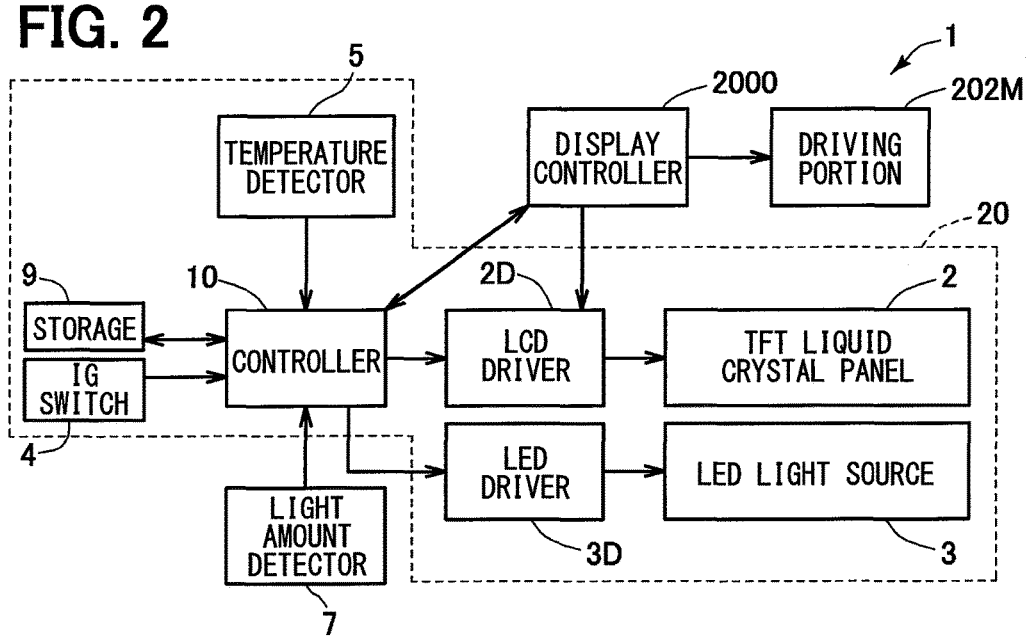
FIG. 2 is a block diagram showing a configuration of the head-up display device shown in FIG. 1.
Figure 3:
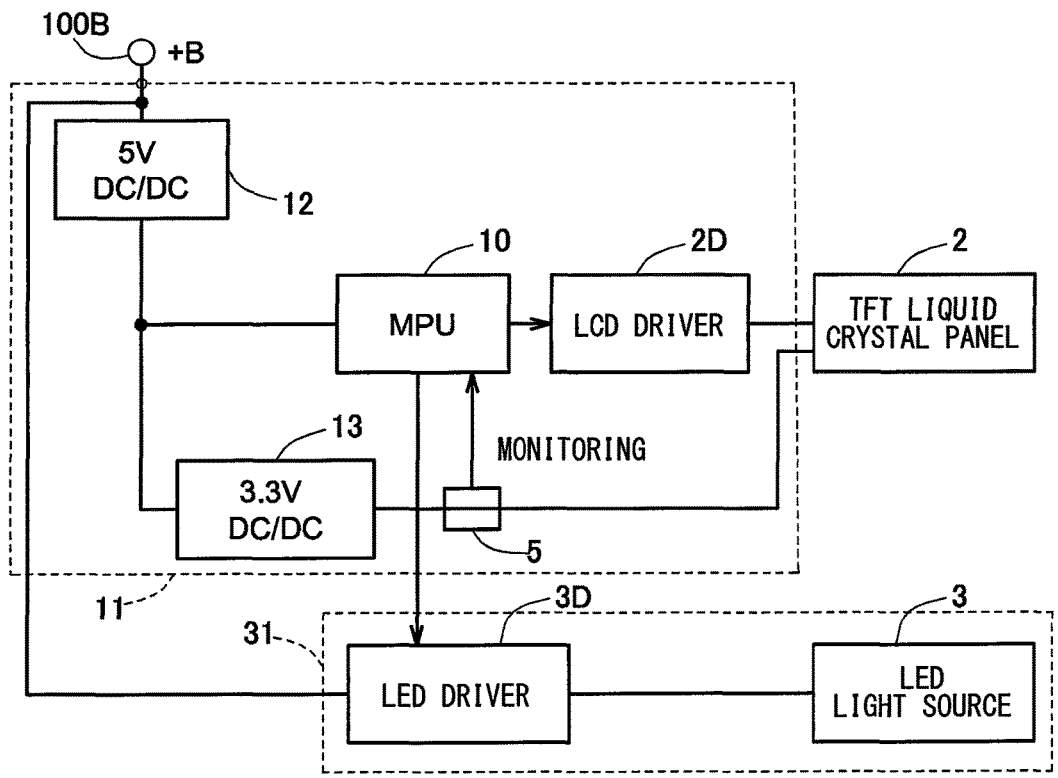
FIG. 3 is a diagram showing a power supply circuit in the head-up display device shown in FIG. 1.

The head-up display device 1 of the present embodiment includes a housing 22 that defines a space (heat transfer space) 22H for transferring heat existing in the vicinity of the light source 3 to the display portion 2 as shown in FIG. 5. The heat transfer space 22H faces both the display portion 2 and the light source 3. The head-up display device 1 also includes a temperature detector 5 that detects a surrounding temperature Ts of the display portion 2 and the light source 3 as shown in FIGS. 2 and 3. Further, the head-up display device 1 includes a controller (first light source control unit) 10. When the surrounding temperature Ts becomes lower than a predetermined reference low-temperature Ta, the controller 10 controls the light source 3 to increase the driving current for emitting the lights in order to increase brightness of the light.

In the above-described configuration, the controller 10 intentionally increases the driving current for emission of lights from the light source 3 in order to increase the temperature of the display portion 2. That is, when the driving current of the light source 3 is increased, the amount of heat generated from the light source 3 and a driving circuit 3D is also increased, and the temperature (ambient temperature) of the internal space 22H in contact with the light source 3 and the driving circuit 3D can be increased. Since the internal space 22H is also in contact with the display portion 2, when the temperature (ambient temperature) of the internal space 22H is increased, the temperature of the display portion 2 is also increased corresponding to the heat (increase in temperature) in the internal space.

Further, when the detection temperature Ts provided by the temperature detector 5 exceeds a predetermined reference high-temperature Tb, the controller 10 (second light source control unit) controls the light source 3 to reduce the brightness of the light by decreasing the driving current for emission of light from the light source 3. The decrease in driving current leads to a decrease in temperature of the display portion 2. When the driving current of the light source 3 is decreased, the amount of heat generated from the light source 3 and the driving circuit 3D is also decreased. Accordingly, the temperature (ambient temperature) of the internal space (heat transfer space) 22H in contact with the light source 3 and the driving circuit 3D is decreased. Since the internal space 22H is also in contact with the display portion 2, when the temperature (ambient temperature) of the internal space 22H is decreased, the temperature of the display portion 2 is also decreased corresponding to the heat (decrease in temperature) in the internal space.

As shown in FIG. 2, the controller 10 is provided by a micro processing unit (MPU) connected to the display panel 2 and the light source 3 via LCD and LED driving circuits (drivers) 2D and 3D. The controller 10 in the present embodiment is also connected to an IG switch (ignition switch) 4, the temperature detector 5 for detecting the surrounding temperature of the display portion 2, a light amount detector (illumination sensor) 7 for detecting the amount of light (illuminance) outside the vehicle, and a storage portion 9 for storing various values of reference temperatures Ta, Tb, and the like.

The temperature detector 5 is provided at the periphery of the display portion 2 to detect the temperature of a surrounding area 21. The temperature detector 5 can be the well-known thermistor or the like. The temperature detector 5 of the present embodiment does not directly detect the temperature of the display portion 2. The temperature detector 5 detects a temperature of another position at which temperature changes corresponding to a temperature change of the display portion 2.

The following will describe a driving control of the light source 3 for the purpose of performing the temperature control of the display portion 2.

Figure 10:
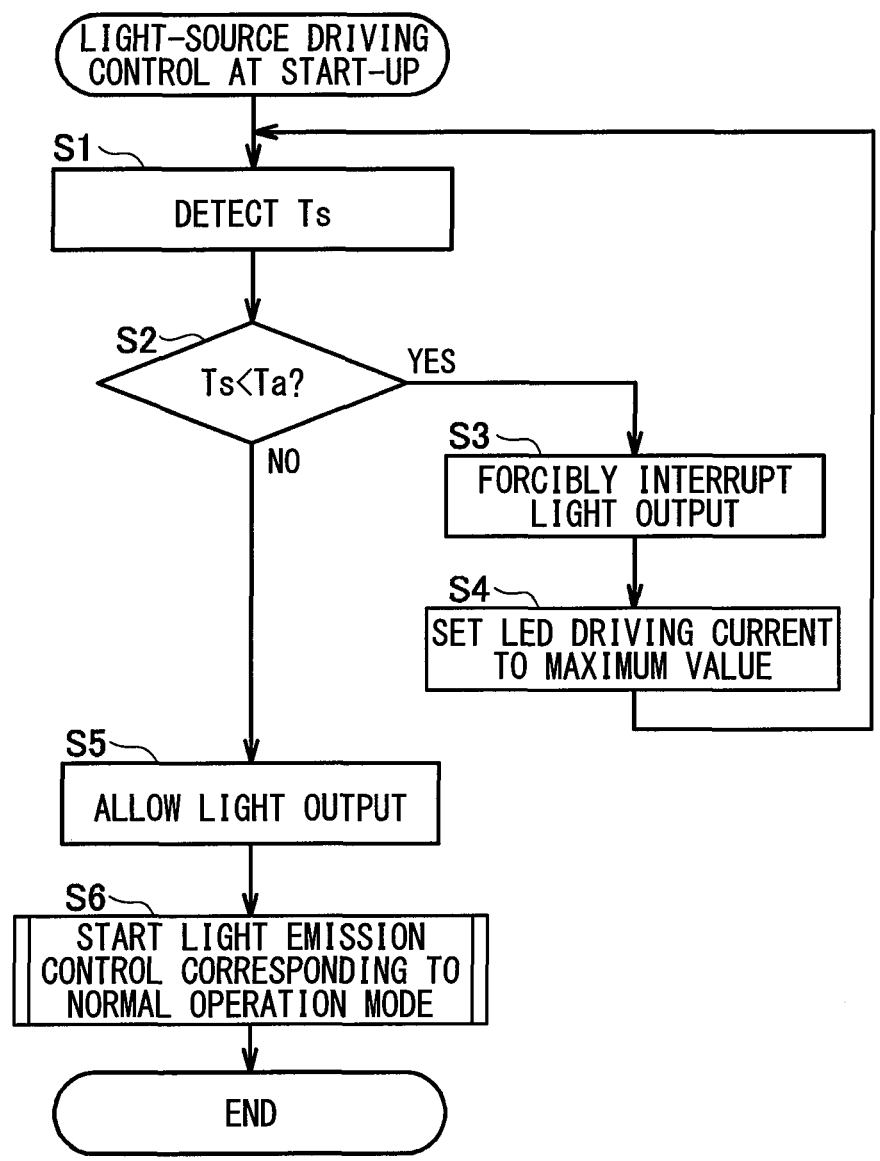
FIG. 10 is a flowchart showing a light-source driving control process executed by the head-up display device shown in FIG. 1 during a start-up of a vehicle engine.

The controller 10 starts the driving control of the light-source as shown in FIG. 10 in response to a turning on of the ignition switch 4. Herein, in order to start the engine, the engine start-up switch (not shown) is turned on by a passenger of the vehicle 100 and the ignition switch 4 is turned on by the turning on of the engine start-up switch.

First, the controller 10 acquires temperature detection information from the temperature detector 5 to detect the surrounding temperature Ts of the display portion (S1: temperature detector). When the detected temperature Ts becomes lower than the predetermined reference low-temperature Ta (S2: YES), the controller 10 controls the lights emitted from the light source 3 to be invisible to the user (S3: visibility control unit). In the present embodiment, the controller 10 outputs, to the driving circuit 2D, an orientation change command for changing the orientation of the liquid crystal cells such that all of the liquid crystal cells of the liquid crystal panel configuring the display portion 2 are oriented to block the lights of the light source 3 from passing through the liquid crystal cells. Additionally, the controller 10 outputs a current change command, to the light source 3, for increasing the driving current of the light source 3 to a maximum current value within a predetermined usable current range (S4). Thus, even though the light source 3 emits lights at a high brightness, the lights output from the light source 3 are invisible to the driver 100D. When this light emission state at high brightness is continued, the light source 3 and the driving circuit 3D generate more heat and the generated heat can increase the temperature of the display portion 2.

When the detected temperature Ts is not lower than the predetermined reference low-temperature Ta (S2: NO), the controller 10 controls the lights emitted from the light source 3 to be visible to the user (S5: visibility control unit). In the present embodiment, in order to control the lights from the light source 3 to be visible to the user, the controller 10 deactivates the orientation change command outputted to the driving circuit 2D. As described above, the orientation change command is a command for changing the orientation of the liquid crystal cells such that all of the liquid crystal cells of the liquid crystal panel configuring the display portion 2 are oriented to block the lights of the light source 3 from passing through the liquid crystal cells. As a result, orientations of the liquid crystals are changed to an arbitrary orientation state (S5: visibility control unit). Then, the controller 10 terminates the control shown in FIG. 10 and starts the light-source driving control corresponding to the normal operation as shown in FIG. 11 (S6).

In the light-source driving control shown in FIG. 10, when the temperature of the liquid crystal panel configuring the display portion 2 falls in a temperature range that cannot guarantee the adequate display response or performance, immediately after the start-up of engine, the controller 10 controls orientations of all of the liquid crystal cells included in the liquid crystal panel 2 to block the lights from passing through the liquid crystal cells and disables the display function. Then, the controller 10 controls the light source 3 to emit lights at the maximum brightness within the usable range of the driving current for generating heat by the light source 3 and the driving circuit 3D. With the heat generated by the light source 3 and the driving circuit 3D, the temperature of the liquid crystal panel 2 can be increased. In normal operation, when the display information is generated by the liquid crystal panel 2, the driving circuit 2D for the liquid crystal panel 2 receives data for display purpose from an external display controller 2000 (see FIG. 2) and controls the driving current for normal energization to each liquid crystal cell based on the received data. In the process shown in FIG. 10, as long as the temperature of the liquid crystal panel 2 is determined to be in the temperature range that cannot guarantee the adequate display response or performance, the controller 10 forcedly prohibits the normal energization of the liquid crystal cells, and executes a different energization in which all of the liquid crystal cells are oriented to block the lights from passing through the liquid crystal cells at a higher priority. When the temperature of the liquid crystal panel 2 is determined to be in the temperature range that can guarantee the adequate display response or performance, the controller 10 starts the normal energization control for each liquid crystal cell based on the received data to project the display information corresponding to the present circumstance on the windshield 100W, so that the driver can view the information displayed on the windshield 100W.

Figure 11:
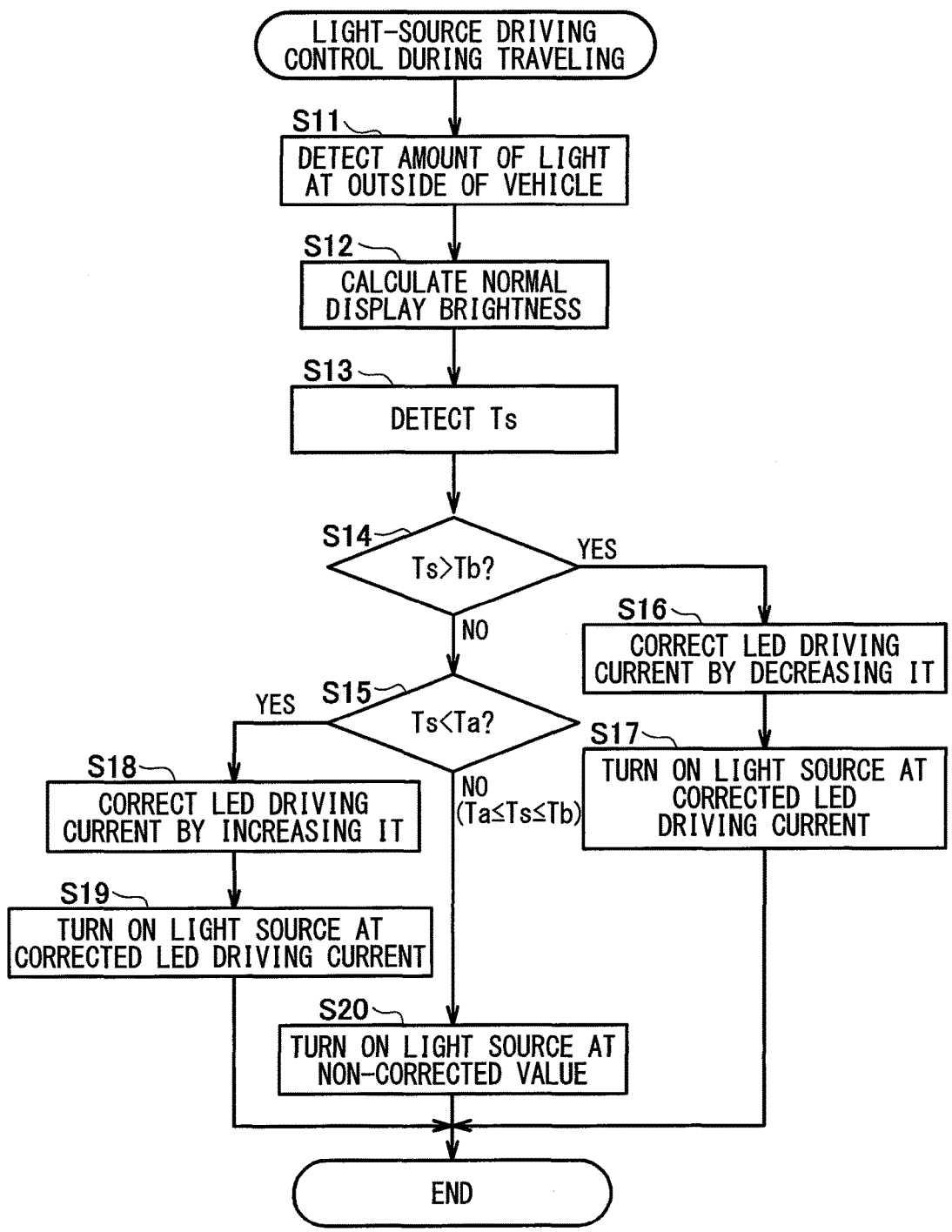
FIG. 11 is a flowchart showing a light-source driving control process executed by the head-up display device shown in FIG. 1 during a normal operation of the vehicle after the engine start-up.

When starting the light-source driving control shown in FIG. 11, the controller 10 first detects the amount of lights of an outside surrounding of the vehicle 100 using the light amount detector 7 (S11), and then calculates the brightness of light required to be output from the light source 3, that is, the driving current of the light source 3 based on the detected amount of light at outside surrounding of the vehicle (S12).

When the surrounding light amount detected by the light amount detector 7 exceeds a predetermined reference light amount, the controller 10 in the present embodiment maintains the driving current of the light source 3 at a predetermined value determined by the display contents. When the surrounding light amount detected by the light amount detector 7 does not exceed the predetermined reference light amount, the controller 10 decreases the driving current of the light source 3 to be lower than the predetermined value by a predetermined level (for example, decrease to 50% or less of the predetermined value (e.g., decrease to 40% of the predetermined value)). The controller 10 may perform a control to increase the brightness of the light source corresponding to an increase of the light amount detected by the light amount detector 7, and to decrease the brightness of the light source corresponding to a decrease of the light amount detected by the light amount detector 7.

Subsequently, the controller 10 detects the surrounding temperature Ts of the display portion 2 by the temperature detector 5 (S13). When the detected surrounding temperature Ts exceeds a predetermined reference high-temperature Tb (S14: YES), the driving current value of the light source 3 which is previously calculated is corrected to be decreased (S16), and then the light source 3 is actuated to emit lights at the corrected driving current (S17).

When the detected surrounding temperature Ts becomes lower than the predetermined reference low-temperature Ta (S14: NO and S15: YES), the controller 10 corrects the driving current value of the light source 3 which is previously calculated to be increased (S18). Then, the controller 10 controls the light source 3 to emit lights under the corrected driving current (S19).

When the detected surrounding temperature Ts is equal to or lower than the above reference high-temperature Tb and is equal to or higher than the above reference low-temperature Ta (S14: NO and S15: NO), the controller 10 causes the light source 3 to emit the light under the previously calculated (which is calculated in S12) driving current value (S20). The controller 10 repeatedly executes the process shown in FIG. 11 at predetermined intervals.

In the present embodiment, the corrected driving current value is determined through a calculation by increasing or decreasing the calculated driving current value (which is calculated in S12) acquired before the correction in a manner of uniform correction or changing by a certain value. To increase or decrease the driving current, for example, the controller 10 can be configured to make correction by increasing or decreasing the calculated driving current value (acquired in S12) uniformly (for example, increase or decrease by 20%). Herein, the calculation of the driving current value after the correction may employ different methods other than the above-described method.

In the case of correcting the driving current of the light source 3 by increasing or decreasing the driving current, when the corrected driving current value is lower than a minimum value of the predetermined usable range of driving current, the corrected driving current value is set equal to the minimum value of the usable range. When the corrected driving current value is higher than a maximum value of the predetermined usable range, the corrected driving current value is set equal to the maximum value of the usable range.

In the processes shown in FIGS. 10 and 11, the reference low-temperature Ta and the reference high-temperature Tb are respectively defined based on an operation guarantee temperature that ensures the normal operation of the display portion 2 and the display response. Specifically, the reference low-temperature Ta and the reference high-temperature Tb are defined based on the lower limit value a and the upper limit value b of the usable temperature range of the display portion 2, respectively. Herein, the usable temperature range of the display portion 2 is set narrower than the operation guarantee temperature range for guaranteeing the normal operation of the display portion 2. In the present embodiment, the reference low-temperature Ta is defined as the temperature detected by the temperature detector 5 when the temperature of the display portion 2 is equal to the lower limit a of the operation guarantee temperature range. The reference high-temperature Tb is defined as the temperature detected by the temperature detector 5 when the temperature of the display portion 2 is equal to the upper limit b of the operation guarantee temperature range.

In the present embodiment, the temperature detector 5 detects a temperature that would be affected by the temperature of the light source 3 and the driving circuit 3D and the temperature of the display portion 2. Thus, the temperature detected by the temperature detector 5 is a value that reflects a present temperature of the display portion 2 or a previous temperature of the display portion 2 that has been measured immediately before the present time. The state in which the temperature detected by the temperature detector 5 is lower than the reference low-temperature Ta indicates that the temperature of the display portion 2 may become lower than the lower limit of the operation guarantee temperature range. The state in which the temperature detected by the temperature detector 5 exceeds the reference high-temperature Tb indicates that the temperature of the display portion 2 may become higher than the higher limit of the operation guarantee temperature range. In the light-source driving control shown in FIG. 11, when the temperature detected by the temperature detector 5 is lower than the reference low-temperature Ta, the brightness of lights emitted from the light source 3 is increased to increase the temperature of the display portion 2. With this configuration, the possibility in which the temperature of the display portion 2 decreases lower than the lower limit of the operation guarantee temperature range of the display portion 2 can be suppressed. When the temperature detected by the temperature detector 5 is higher than the reference high-temperature Tb, the brightness of lights emitted from the light source 3 is decreased to decrease the temperature of the display portion 2. With this configuration, the possibility that the temperature of the display portion 2 increases higher than the upper limit of the operation guarantee temperature range of the display portion 2 can be suppressed. Accordingly, the head-up display device according to the present embodiment can suppress a deviation of the temperature of the display portion 2 from the operation guarantee temperature range.

The temperature detector 5 is located at a predetermined position so that the actually measured driving current of the light source 3 and the actually measured detection temperature of the temperature detector 5 have a proportional relationship. Thus, the driving current of the light source 3 and the temperature of the display portion 2 have a correlation relationship. The state in which the driving current of the light source 3 and the detection temperature of the temperature detector 5 have the proportional relationship indicates that the driving current for activating the light source 3 is set as a certain value, and that the certain value of the driving current and a saturated value of the temperature detected by the temperature detector 5 during energization have the relationship shown in FIG. 8. Specifically, in the relationship shown in FIG. 8, when the certain value of the driving current varies, the saturated value follows in proportion to the driving current value, under a condition of maintaining a temperature of the atmosphere outside the head-up display device 1 (herein, the temperature at an outside of the vehicle or the temperature of a predetermined position in the vehicle). The temperature detected by the temperature detector 5 is also affected by the temperature of the display portion 2. The state in which the saturated value of the temperature detected by the temperature detector 5 is determined indicates that a saturated value of the temperature of the display portion 2 is also determined. Thus, the driving current of the light source 3 and the temperature of the display portion 2 can have the correlation relationship. In fact, the relationship has an error as shown in FIG. 8, but the proportional relationship is still satisfied even in the presence of such an error.

Figure 8:
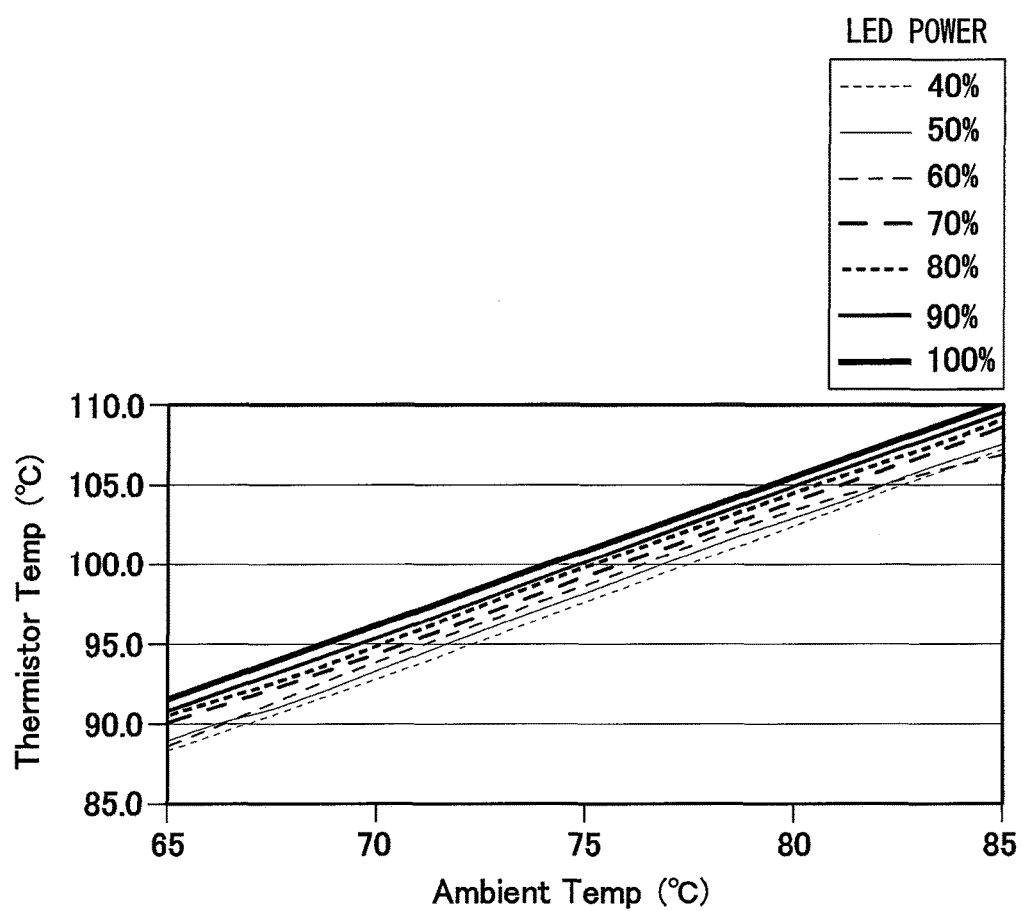
FIG. 8 is a diagram showing a relationship between driving current of a light source and detection temperature of a temperature detector in the head-up display device shown in FIG. 1.

As illustrated in FIG. 8, in the present embodiment, even after changing the temperature at an outside portion of the head-up display device 1 (or the outside air temperature), the proportional relationship in which the driving current follows the detected temperature as mentioned above is still maintained. The relationship is actually measured in a temperature range where the temperature at an outside of the head-up display device 1 (the outside air temperature) is positioned close to an actual usable environment. Further, the same relationship is acquired in a predetermined temperature range other than the above temperature range that corresponds to the surroundings of the usable environment.

The following will describe an internal structure of the head-up display device 1 and a configuration of the temperature detector 5 in the present embodiment.

Figure 4:
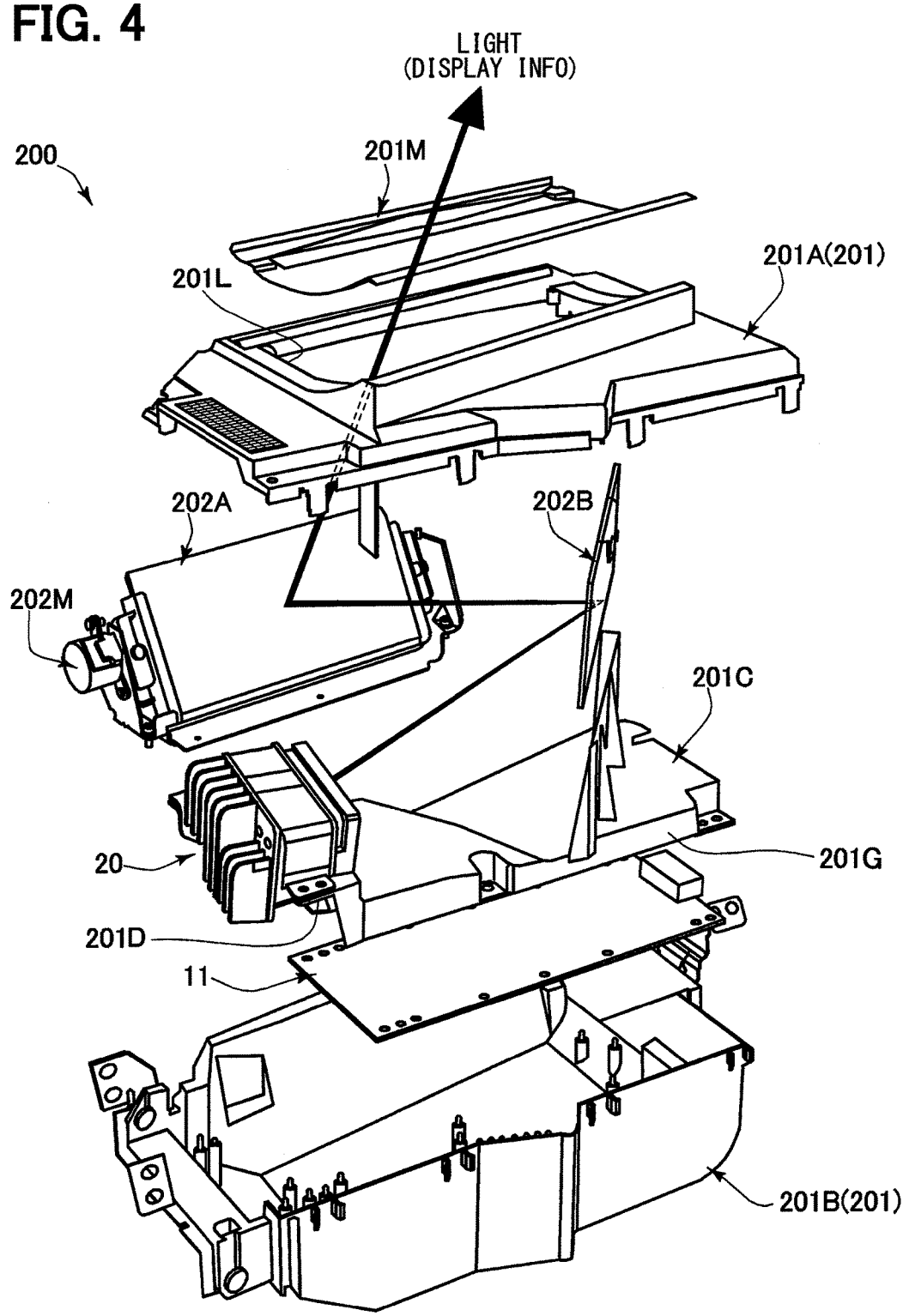
FIG. 4 is an exploded perspective view showing a display output portion of the head-up display device shown in FIG. 1.

As shown in FIG. 4, the display output portion 200 in the present embodiment includes the main body 20 and a case (device case) 201 that houses the main body 20. The case 201 includes a first side case portion (upper case) 201A forming a first side (here, an upper side of the vehicle 100), and a second side case portion (lower case) 201B forming a second side (here, a lower side of the vehicle 100) opposite to the first side. The case 201 houses the main body 20 that contains the display portion 2 and the light source 3, and also houses optical members 202A and 202B that provide optical transmission paths for guiding the lights (display information) emitted from the main body 20 to an output opening 201L of the case 201 (first side case portion 201A).

The output opening 201L in the present embodiment is covered by a transparent dust-proof cover member 201M.

The optical member 202B in the present embodiment is provided by a plane mirror, and the optical member 202A is provided by a magnifier that magnifies and reflects incident lights. The display information emitted from the display output portion 200 is magnified by the magnifier 202A and is projected onto the windshield 100W. Here, the magnifier 202A can change reflection direction of lights using a driving portion (motor) 202M. For example, the magnifier 202A can change the projected position of the display information on the windshield 100W by changing the reflection direction of lights. The optical members 202A and 202B are not be limited to the above-described structures of the present embodiment, and can be modified by changing the shapes, replacing these members, changing the configuration, or the like, as appropriate.

As shown in FIG. 5, the case 201 in the present embodiment defines a main body housing portion 201H, an optical system housing portion 201I, and a main control substrate housing portion 201J. The main body 20 is housed in the main body housing portion 201H. The optical system housing portion 201I houses the optical members 202A and 202B (see FIG. 4). The main control substrate housing portion 201J houses a main control substrate 11 on which a main controller 10 is disposed as described later.

In the present embodiment, as illustrated in FIGS. 4 and 5, the housing portions 201H, 201I, and 201J are partitioned by an inner case portion (internal case) 201C disposed inside of the case 201. Specifically, the inner case portion (internal case) 201C is arranged as a partition wall 201G that partitions the optical system housing portion 201I from the main control substrate housing portion 201J. The wall 201G has a cut portion on one end side (on the right side shown in FIG. 5). The internal spaces of the main control substrate housing portion 201J and the optical system housing portion 201I communicate with each other via an opening 201K disposed close to the cut portion of the wall 201G.

The inner case portion (internal case) 201C has a fixing portion 201D (see FIG. 4) for fixing the main body 20, at a position next to the cut portion of the wall 201G. At the same time, the main body 20 is fixed to the fixing portion 201D so that the main body 20 corresponds to the opening 201K on the side of the optical system housing portion 201I. The main body housing portion 201H forms a space for housing the main body 20, and is disposed on the side of the optical system housing portion 201I with respect to the opening 201K. The optical system housing portion 201I is formed as a space adjacent to the main body housing portion 201H and is disposed adjacent to the main control substrate housing portion 201J. The wall 201G is sandwiched by the optical system housing portion 201I and the main control substrate housing portion 201J. In the present embodiment, in the main body housing portion 201H and the optical system housing portion 201I, a wall 201W extends from the first side case portion 201A toward the inner case portion 201C, and another wall 201W extends from the wall 201G toward the first side case portion 201A. Further, an opening 201L is defied between the two walls 201W. The two walls 201W partition the main body housing portion 201H from the optical system housing portion 201I. The main control substrate housing portion 201J contains a space of the fixing portion 201D on the side of the main control substrate housing portion 201J. The main control substrate housing portion 201J is adjacent to both the main body housing portion 201H and the optical system housing portion 201I.

The casing 201 in the present embodiment is configured such that when mounting the casing 201 to the vehicle 100, the main body housing portion 201H and the optical system housing portion 201I are adjacent to each other in the horizontal direction on the upper side of the case. Further, the main control substrate housing portion 201J is formed to be adjacent to the lower sides of the main body housing portion 201H and the optical system housing portion 201I.

In the present embodiment, the first side case portion 201A is positioned in the case 201 on the upper side of the vehicle 100, and the second side case portion 201B is positioned in the case 201 on the lower side of the vehicle 100. The inner case portion 201C is positioned between the first and second side case portions 201A and 201B. The main body housing portion 201H and the optimal system housing portion 201I are formed on the side of the first side case portion 201A with respect to the inner case portion 201C, and the main control substrate housing portion 201J is formed on the side of the second side case portion 201B.

In the present embodiment, a vent hole 2H1 is provided in the case 201 on the upper side of the vehicle 100 to communicate with the outside space (space outside the device) 20H. A vent hole 2H2 is provided in the case 201 on the lower side of the vehicle 100 to communicate with the outside space (space outside the device) 20H. In this way, heat inside the case 201 can be effectively released. In the present embodiment, the vent hole 2H1 is formed as a through hole that penetrates the first side case portion 201A upward with respect to the vehicle 100, and the vent hole 2H2 is formed as a through hole that penetrates the second side case portion 201B downward with respect to the vehicle 100.

As shown in FIG. 5, the main body 20 is disposed between the display portion 2 and the light source 3 via a space (heat transfer space) 22H, and the display portion 2 and the light source 3 are housed in the main body case 22. As illustrated in FIGS. 4 to 6, the main body case 22 in the present embodiment includes a cylindrical portion 22A, a lid portion (case lid) 22B, and a heat release portion 22F. The cylindrical portion 22A has a cylindrical shape that is coaxial with an axis line directed from the light source 3 to the display portion 2. The lid portion 22B is assembled and fixed to one opening of the cylindrical portion 22A on the side of the display portion 2. The heat release portion 22F is assembled and fixed to the other opening of the cylindrical portion 22A on the side of the light source 3. Thus, the internal space 22H is formed within the main body 20 and is partitioned from the outside of the main body 20. In the present embodiment, lens members 23 and 25 and a light diffusion sheet 24, which are well-known, are disposed in the internal space 22H as the optical members for collecting lights emitted from the light source 3 and controlling the collected light to enter a backside 2B of the display portion 2 widely and uniformly. Here, the two lens members 23 and 25 and one light diffusion sheet 24 are used for above-described purpose. The lens member 23 is a diffusion lens, whereas the lens member 25 is a collecting lens.

A circuit board 31 equipped with the light source 3 is disposed on an inner main surface 22FA (see FIG. 7) of the heat release portion 22F, and the inner main surface 22FA faces an internal space 22H. Here, the heat release portion 22F is fixed to the circuit board 31 with screw members 22N (see FIG. 7). The circuit board 31 is an aluminum substrate having a high heat release performance. Fins 22G for heat release are formed on the outer side of the heat release portion 22F opposite to the main surface 22FA. The fins 22G are arranged to penetrate the case 201 of the display output portion 200 from the inner side to the outer side of the case.

The lid portion 22B has a light emission hole 22J at a center portion. From the light emission hole 22J, lights emitted from the light source 3 is transmitted toward the outside through the display panel 2. An assembly portion 22C is provided at the cylindrical portion 22A to extend toward a peripheral edge portion 22E of the light emission hole 22J at the center of the lid portion 22B. The display portion 2 may be assembled by a fixed member (not shown) or by engagement of engaging portions while being sandwiched between an assembly portion 22C and the peripheral edge portion 22E of the lid portion 22B.

The main body case 22 is a light-source housing portion that houses the light source 3 in the internal space 22H. The light source 3 and a mounting surface 31A of the circuit board 31 to which the light source 3 is attached are disposed to be exposed to the internal space 22H. The lights emitted from the light source 3 are transmitted from the inside of the main body case 22 toward the outside via the optical members 23 to 25 and the display portion 2, which covers the light emission hole 22J.

As shown in FIG. 3, the main control substrate 11 has a power source circuit connected to a vehicle battery 100B and a micro processing unit (MPU). The MPU functions as the controller 10 for controlling a power source system of the head-up display device 1. As shown in FIG. 2, about 12 V of voltage from the vehicle battery 100B (battery voltage +B) is input to the controller 10 via a DC/DC converter 12 so that a voltage of 5 V is input as a power source voltage to the controller 10 and 12 V of voltage from the vehicle battery 100B is input to the display portion 2 via the DC/DC converter 12 and a 3.3 V DC/DC converter as a power source voltage to the display portion 2. In a power supply line for 3.3 V that is input to the display portion 2, a thermistor is provided as the temperature detector 5 to reduce inrush current. The controller 10 monitors the resistance value change of the temperature detector 5 caused by the temperature change. In the present embodiment, the driving circuit 3D for the light source 3 is provided in another circuit board 31. A power source voltage (battery voltage) from the vehicle battery 100B is also input to the driving circuit 3D via the power source circuit positioned over the main control substrate 11.

In the present embodiment, the driving circuit 2D for the display portion 2 is provided at the main control substrate 11. The driving circuit 2D may be provided at another substrate different from the main control substrate 11. The main control substrate 11 in the present embodiment connects among respective connectors 11C, 2C, and 3C via wiring members, including lead wires 2L and 3L, with respect to the display portion 2 and the circuit board 31.

The temperature detector 5 is disposed outside the main body 20. The temperature detector 5 in the present embodiment is provided in the adjacent space 201J (21) that is adjacent to the internal space 22H of the main body case (light-source housing portion) 22 housing the light source 3 via the cylindrical portion 22A (wall 22D). In the present embodiment, the inside of the main control substrate housing portion 201J corresponds to the adjacent space 201J.

Further, the temperature detector 5 in the present embodiment is mounted on another main control substrate 11 different from the circuit board 31 on which the light source 3 is mounted and the driving circuit 3D for the light source 3 is arranged. The internal space 22H in the main body case 22 has a vent hole 20L communicating with the main body housing portion 201H, which is outside the internal space 22H. As a result, the internal space 22H also communicates with the main control substrate housing portion 201J. Thus, heat generated from the light source 3 and the mounting substrate 31 is transferred to the temperature detector 5 via the internal space 22H of the main body 20, the internal space of the main body housing portion 201H, and the internal space of the main control substrate housing portion 201J. That is, the heat generated from the light source 3 and the mounting substrate 31 is not directly transferred to the temperature detector 5 to be detected, but transferred via the spaces (gas) to be detected. More specifically, the heat is transferred via the spaces positioned in a plurality of partitioned portions to be detected. In a case where the temperatures of the light source 3 and the mounting substrate 31 drastically change, such change of the temperature is not directly detected, and is properly detected in the form of average level.

The temperature detector 5 in the present embodiment is positioned directly under a position (intermediate position) between the display portion 2 and the light source 3 that are opposed to each other in the horizontal direction of the vehicle 100. Thus, the temperature detector 5 can detect the temperature that reflects both the temperature of the display portion 2, and the temperature of the light source 3 and circuit board 31 in a well-balanced manner.

The temperature detector 5 of the present embodiment is disposed directly under the main body 20 on a main surface 11B of the main control substrate 11 in the vicinity of the main body 20.

The temperature detector 5 in the present embodiment is disposed above the vent hole 2H2 provided at a bottom wall 201F of the second side case portion 201B that forms the main control substrate housing portion 201J or is disposed above a periphery portion of the vent hole 2H2.

In a usual head-up display device, lights from the light source are projected onto a projecting member positioned away from the light source, so that a user can view an image produced by the reflected lights. Thus, the head-up display device needs to cause the light source to emit light at higher brightness, compared to other display devices. The emission of lights for providing a high brightness display causes generation of larger amount of heat compared with other display devices. In contrast, the present disclosure makes effective use of the heat for heating the display portion. When the temperature the display portion falls to a low temperature that cannot ensure the adequate display response performance, the display portion is heated by the heat generated during emission of the lights from the light source. Thus, the adequate display response performance can be ensured. Compared with the related art, the display device according to the present embodiment does not need a heater, a control circuit, or the like dedicated to heat the display portion. In the present embodiment, the temperature detector does not directly detect the temperature of the display portion, but detects the surrounding temperature of both the display portion and the light source. That is, when the temperature detector detects the temperature, the influences of both the display portion and the light source are taken into consideration. Such a surrounding temperature can estimate not only the present temperature of the display portion, but also the future change in temperature of the display portion based on the change in the surrounding temperature. The use of the surrounding temperature can control the emission of lights from the light source 3 such that the temperature of the display portion is continuously set equal to the reference low-temperature or higher.

When the display portion is excessively heated, it is necessary to cool the display portion. However, the emission of lights from the light source in the structure of the present disclosure might interfere with the cooling. Thus, in the head-up display device of the present disclosure, when the temperature detected by the temperature detector exceeds the predetermined reference high-temperature, the light source control unit serves to decrease the driving current for emission of light from the light source to reduce the brightness of the light, thus decreasing the temperature of the heat transfer space because of reduced heat generation by decreasing the driving current. Such a decrease in temperature of the space can effectively controls the temperature of the display portion to be reduced. With the configuration described above, when the display portion is excessively heated, the display portion is cooled by reducing the light emission level of the light source.

One embodiment of the present disclosure has been described above. However, the embodiment herein is only illustrative, and the present disclosure is not limited thereto. It is to be understood that various changes, including addition and omission, can be made to the embodiment based on the knowledge of a person skilled in the art without departing from the scope of the present disclosure. Now, modified examples of the above-mentioned embodiment will be described. Components common to those described in the above examples are designated by the same reference numerals to omit the description of these components. The above-mentioned examples and the following modified examples can be combined in use as appropriate without technical inconsistencies.

In the foregoing embodiment, the display portion 2 is provided by the TFT liquid crystal panel. As another example, any other display panel with the same kind of the display response performance may be used in the same way as described above.

In the foregoing embodiment, the light-source driving control shown in FIG. 10 is carried out to control the lights emitted from the light source 3 to be invisible to the user (S3: visibility control unit) by using the liquid crystal panel 2. The liquid crystal panel 2 serves as an optical transmittance varying portion that is capable of varying the optical transmittance to prevent the projection of the light from the light source 3 onto the projection member 100W. Alternatively, other methods may be employed. For example, an optical transmittance varying portion (visibility switching unit) capable of interrupting projection of the lights from the light source 3 onto the windshield 100W may be provided separately from the above-mentioned liquid crystal panel 2 and under a control of the controller 10. Alternatively, a path changing portion (visibility switching unit) may be provided for changing an output path of the light emitted from the light source 3 to prevent the projection of the light from the light source 3 onto the windshield 100W. In the embodiment described above, the path changing portion can be the driving portion (motor) 202M, and the driving portion 202M may be controlled by the display controller 2000 in accordance with a command output from the controller 10.

The above embodiment executes the light-source driving control processes as illustrated in FIGS. 10 and 11. Alternatively, only one of the processes may be carried out as the light-source driving control. In the light-source driving control shown in FIG. 11, only the processes (S14, S16, and S17) for reducing the driving current of the light source 3 by correction may be performed. Conversely, only the processes (S15, S18, and S19) for increasing the driving current of the light source 3 by correction may be performed.

In the embodiment described above, the temperature detector 5 is disposed at a predetermined position so that the detection temperature Ts and the driving current of the light source 3 have the predetermined proportional relationship. Alternatively, the temperature detector 5 may be disposed to have other relationships, for example, at a position where the detection temperature Ts increases corresponding to an increase of the driving current of the light source 3. Such a relationship may be defined based on actual measurements. Like the above-mentioned embodiment, the relationship is defined by the saturated value of the temperature detected by the temperature detector 5.

It is noted that a flowchart or the process of the flowchart in the present disclosure includes units (also referred to as steps), each of which is represented, for instance, as S1.

Further, each unit can be divided into several sub-units while several units can be combined into a single unit Furthermore, each of thus configured units can be also referred to as a circuit, device, module, or means.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A head-up display device for a vehicle, wherein the head-up display device projects lights toward an external projection member, the lights are emitted from a light source and include a display information generated by a display portion, and the lights are reflected on the external projection member to produce an image indicating the display information to be visible to a user who is located at a predetermined position, the head-up display device comprising:
a housing for housing the display portion and the light source, the display portion and the light source being disposed facing each other via a heat transfer space in the housing;
a temperature detector disposed outside of the housing in a surrounding area of the display portion and the light source, and detecting a temperature of the surrounding area; and
a light source control unit controlling a brightness of the lights emitted from the light source to be increased by increasing a driving current of the light source when the temperature detected by the temperature detector is lower than a reference low-temperature, wherein the increased driving current generates heat and the generated heat is transferred to the display portion via at least the heat transfer space, and the heat transferred to the display portion increases a temperature of the display portion;
a visibility switching unit switching, during a light emission operation of the light source, a visibility of the display information between a visible state in which the display information is visible to the user and an invisible state in which the display information is invisible to the user; and
a visibility control unit controlling the visibility switching unit to switch the visibility of the display information to the invisible state when the temperature detected by the temperature detector is lower than the reference low-temperature, wherein
the light source control unit increases the driving current of the light source after the visibility switching unit switches the visibility of the display information to the invisible state in which the display information is invisible to the user,
the display portion is provided by a liquid crystal panel which is capable of changing an optical transmittance by changing orientations of liquid crystals and the liquid crystal panel also functions as the visibility switching unit,
the visibility control unit controls the visibility switching unit to change the orientations of the liquid crystals of the liquid crystal panel so that the lights emitted from the light source are blocked by the liquid crystals from being projected toward the projection member when the temperature detected by the temperature detector is lower than the reference low-temperature, and the heat generated by the light source is transferred to the temperature detector through the heat transfer space in the housing and one or more partitioned spaces outside of the housing.

2. The head-up display device for a vehicle according to claim 1, wherein the temperature detector is disposed at a predetermined position so that the temperature detected by the temperature detector and the driving current of the light source satisfy a predetermined relationship.

3. The head-up display device for a vehicle according to claim 2, wherein the temperature detector is disposed at the predetermined position so that the predetermined relationship is defined as a proportional relationship.

4. The head-up display device for a vehicle according to claim 1, further comprising:

a light amount detector detecting an amount of lights at an outside of a vehicle, wherein the light source control unit calculates the driving current of the light source and corrects the calculated driving current of the light source based on the detected amount of lights at the outside of the vehicle.

5. The head-up display device for a vehicle according to claim 1, wherein the light source control unit is provided as a first light source control unit, the head-up display device further comprising:

a second light source control unit decreasing the driving current of the light source to reduce the brightness of the lights emitted from the light source when the temperature detected by the temperature detector is higher than a reference high-temperature, wherein an amount of heat generated by the driving current decreases corresponding to a decrease of the driving current, a decrease of the amount of heat generated by the driving current causes a decrease of a temperature in the heat transfer space, and the decrease of the temperature in the heat transfer space causes a decrease of the temperature of the display portion.

6. The head-up display device for a vehicle according to claim 1, wherein the heat transfer space is partitioned, by a wall, from an adjacent space which is provided adjacent to the heat transfer space within a device case for housing the display portion, the light source, and the temperature detector, and the temperature detector is disposed in the adjacent space.

7. A head-up display device for a vehicle, wherein the head-up display device projects lights toward an external projection member, the lights are emitted from a light source and include a display information generated by a display portion, and the lights are reflected on the external projection member to produce an image indicating the display information to be visible to a user who is located at a predetermined position, the head-up display device comprising:

a housing for housing the display portion and the light source, the display portion and the light source being disposed facing each other via a heat transfer space in the housing;

a temperature detector disposed outside of the housing in a surrounding area of the display portion and the light source, and detecting a temperature of the surrounding area; and a light source control unit controlling a brightness of the lights emitted from the light source to be increased by increasing a driving current of the light source when the temperature detected by the temperature detector is lower than a reference low-temperature, wherein the increased driving current generates heat and the generated heat is transferred to the display portion via at least the heat transfer space, and the heat transferred to the display portion increases a temperature of the display portion, the heat transfer space is partitioned, by a wall, from an adjacent space which is provided adjacent to the heat transfer space within a device case for housing the display portion, the light source, and the temperature detector, and the temperature detector is disposed in the adjacent space.

8. The head-up display device for a vehicle according to claim 7, wherein the device case has vent holes which are respectively disposed on an upper side and a lower side of the heat transfer space when the head-up display device is equipped to a vehicle, each of the vent holes communicates the heat transfer space with an outside space, and the heat transfer space is located inside of the device case which houses the display portion, the light source, and the temperature detector, and the outside space is located outside of the device case.

9. A head-up display device for a vehicle, wherein the head-up display device projects lights toward an external projection member, the lights are emitted from a light source and include a display information generated by a display portion, and the lights are reflected on the external projection member to produce an image indicating the display information to be visible to a user who is located at a predetermined position, the head-up display device comprising:

a housing for housing the display portion and the light source, the display portion and the light source being disposed facing each other via a heat transfer space in the housing;

a temperature detector disposed outside of the housing in a surrounding area of the display portion and the light source, and detecting a temperature of the surrounding area; and a light source control unit controlling a brightness of the lights emitted from the light source to be increased by increasing a driving current of the light source when the temperature detected by the temperature detector is lower than a reference low-temperature, wherein the increased driving current generates heat and the generated heat is transferred to the display portion via at least the heat transfer space, and the heat transferred to the display portion increases a temperature of the display portion, the device case has vent holes which are respectively disposed on an upper side and a lower side of the heat transfer space when the head-up display device is equipped to a vehicle, each of the vent holes communicates the heat transfer space with an outside space, the heat transfer space is located inside of the device case which houses the display portion, the light source, and the temperature detector, and the outside space is located outside of the device case, and the heat generated by the light source is transferred to the temperature detector through the heat transfer space in the housing and one or more partitioned spaces outside of the housing.

* * * * *